United States Patent
Bangalore

(10) Patent No.: US 7,778,944 B2
(45) Date of Patent: Aug. 17, 2010

(54) SYSTEM AND METHOD FOR COMPILING RULES CREATED BY MACHINE LEARNING PROGRAM

(75) Inventor: Srinivas Bangalore, Morristown, NJ (US)

(73) Assignee: AT+T Intellectual Property II, L.P., New York, NY (US)

(*) Notice: Subject to any disclaimer, the term of this patent is extended or adjusted under 35 U.S.C. 154(b) by 0 days.

(21) Appl. No.: 12/262,299

(22) Filed: Oct. 31, 2008

(65) Prior Publication Data

US 2009/0063375 A1    Mar. 5, 2009

Related U.S. Application Data

(63) Continuation of application No. 11/268,203, filed on Nov. 7, 2005, now Pat. No. 7,451,125.

(60) Provisional application No. 60/625,993, filed on Nov. 8, 2004.

(51) Int. Cl.
   G06F 15/18 (2006.01)
   G06F 17/27 (2006.01)

(52) U.S. Cl. ............................. 706/12; 704/9

(58) Field of Classification Search ............. 706/12
   See application file for complete search history.

(56) References Cited

U.S. PATENT DOCUMENTS

| | | | | |
|---|---|---|---|---|
| 5,398,304 A * | 3/1995 | Bauman et al. | ......... | 706/49 |
| 5,402,524 A * | 3/1995 | Bauman et al. | ......... | 706/45 |
| 5,402,526 A * | 3/1995 | Bauman et al. | ......... | 706/49 |
| 5,412,756 A * | 5/1995 | Bauman et al. | ......... | 706/45 |
| 5,477,451 A * | 12/1995 | Brown et al. | ......... | 704/9 |
| 5,510,981 A * | 4/1996 | Berger et al. | ......... | 704/2 |
| 5,768,603 A * | 6/1998 | Brown et al. | ......... | 704/9 |
| 5,805,832 A * | 9/1998 | Brown et al. | ......... | 711/1 |
| 5,806,032 A | 9/1998 | Sproat | | |
| 5,819,247 A | 10/1998 | Freund et al. | | |
| 6,032,111 A * | 2/2000 | Mohri | ......... | 704/9 |
| 6,411,932 B1 | 6/2002 | Molnar et al. | | |
| 6,453,307 B1 | 9/2002 | Schapire et al. | | |
| 6,490,549 B1 | 12/2002 | Ulicny et al. | | |
| 6,556,972 B1 * | 4/2003 | Bakis et al. | ......... | 704/277 |
| 6,574,597 B1 | 6/2003 | Mohri et al. | | |
| 6,601,026 B2 | 7/2003 | Appelt et al. | | |
| 6,735,592 B1 | 5/2004 | Neumann et al. | | |
| 6,745,161 B1 | 6/2004 | Arnold et al. | | |
| 6,816,830 B1 | 11/2004 | Kempe | | |

(Continued)

OTHER PUBLICATIONS

The AT&T spoken language understanding system, Gupta, N.; Tur, G.; Hakkani-Tur, D.; Bangalore, S.; Riccardi, G.; Gilbert, M.; Audio, Speech, and Language Processing, IEEE Transactions on vol. 14, Issue: 1 Digital Object Identifier: 10.1109/TSA.2005.854085 Publication Year: 2006, pp. 213-222.*

(Continued)

*Primary Examiner*—Michael Holmes

(57) ABSTRACT

A system, a method, and a machine-readable medium are provided. A group of linear rules and associated weights are provided as a result of machine learning. Each one of the group of linear rules is partitioned into a respective one of a group of types of rules. A respective transducer for each of the linear rules is compiled. A combined finite state transducer is created from a union of the respective transducers compiled from the linear rules.

20 Claims, 2 Drawing Sheets

U.S. PATENT DOCUMENTS

| | | | |
|---|---|---|---|
| 6,859,778 B1 * | 2/2005 | Bakis et al. | 704/277 |
| 6,868,383 B1 | 3/2005 | Bangalore et al. | |
| 6,910,003 B1 | 6/2005 | Arnold et al. | |
| 7,069,215 B1 | 6/2006 | Bangalore et al. | |
| 7,113,903 B1 | 9/2006 | Riccardi et al. | |
| 7,181,386 B2 | 2/2007 | Mohri et al. | |
| 7,197,460 B1 | 3/2007 | Gupta et al. | |
| 7,200,550 B2 | 4/2007 | Menezes et al. | |
| 7,225,131 B1 | 5/2007 | Bangalore et al. | |
| 7,233,938 B2 | 6/2007 | Carus et al. | |
| 7,257,575 B1 | 8/2007 | Johnston et al. | |
| 7,289,948 B1 | 10/2007 | Mohri | |
| 7,295,975 B1 | 11/2007 | Bangalore et al. | |
| 7,299,180 B2 | 11/2007 | Wang et al. | |
| 7,379,946 B2 | 5/2008 | Carus et al. | |
| 7,386,441 B2 | 6/2008 | Kempe et al. | |
| 7,451,125 B2 * | 11/2008 | Bangalore | 706/47 |

OTHER PUBLICATIONS

A speech recognition system for connected word sequences, Skinner, T.; Kloker, D.; Medress, M.; Acoustics, Speech, and Signal Processing, IEEE International Conference on ICASSP '76. vol. 1 Publication Year: 1976 , pp. 434-437.*

An efficient approach to rule redundancy reduction in hierarchical phrase-based translation, Licheng Fang; Chengqing Zong; Natural Language Processing and Knowledge Engineering, 2008. NLP-KE '08. International Conference on Digital Object Identifier: 10.1109/NLPKE.2008.4906773 Publication Year: 2008 , pp. 1-6.*

Shallow Parsing Based on Maximum Matching Method and Scoring Model, Mao-Sheng Zhong; Lei Liu; Ru-Zhan Lu; Innovative Computing Information and Control, 2008. ICICIC '08. 3rd International Conference on Digital Object Identifier: 10.1109/ICICIC.2008.491 Publication Year: 2008 , pp. 408-408.*

Boulianne, G. et al., "French large vocabulary recognition with cross-word phonology transducers", Acoustics, Speech and Signal Processing, 2000, ICASSP '00 Proceedings, 2000 IEEE International Conference on vol. 3, Jun. 5-9, 2000, pp. 1675-1678.

Perez, A. et al., Speech Translation with Phrase Based Stochastic Finite-State Transducers, Acoustics, Speech and Signal Processing, 2007, ICASSP 2007, IEEE International Conference on vol. 4, Apr. 15-20, 2007, pp. IV-113-IV-116 Digital Object Identifier.

Hori, T. et al., "Language model adaptation using WFST-based speaking-style translation", Acoustics, Speech and Signal Processing, 2003, ICASSP '03, IEEE International Conference on vol. 1, Apr. 6-10, 2003, pp. I-228-I-231.

Dolfing, H. et al., "Incremental language models for speech recognition using finite-state transducers", Automatic Speech Recognition and Understanding, 2001, ASRU '01, IEEE Workshops on Dec. 9-13, 2001, pp. 194-197.

Masuda, Y. et al., "A multifaceted Internet language environment for the hearing impaired", Cognitive Technology, 1997, 'Humanizing the Information Age', Proceedings, Second International Conference on Aug. 25-28, 1997, p. 174, Digital Object Identifier 10.1109/CT.1997.617697.

Casacuberta, F. et al., "Recent efforts in spoken language translation", Signal Processing Magazine, IEEE vol. 25, Issue 3, May 2008, pp. 80-88, Digital Object Identifier 10.1109/MSP.2008.917989.

2005 IEEE International Conference on Acoustics, Speech and Signal Processing, 2005, Proceedings, (ICASP '05), IEEE International Conference on vol. 3, Mar. 18-23, 2005, pp. 0_1-0_1, Digital Object Identifier 10.1109/ICASSP.2005.1415622.

Fromm, P. et al., "Natural language processing for dynamic environments", Industrial Electronics Society, 1998, IECON '98, proceedings of the 24th Annual Conference of the IEEE vol. 4, Aug. 31-Sep. 4, 1998, pp. 2018-2021, Digital Object Identifier 10.1109/IECON.1998.724028.

Jimenez, V.M. et al., "Some Results with a trainable speech translation and understanding system", Acoustics, Speech and Signal Processing, 1995, ICASSP-95, 1995 International Conference on vol. 1, May 9-12, 1995, pp. 113-116, Digital Object Identifier 10.1109/ICASSP.1995.479286.

Szarvas, M. et al., "Finite-state transducer based modeling of morphosyntax with applications to Hungarian LVCSR", Acoustics, Speech and Signal Processing, 2003, Proceedings, (ICASSP '03), 2003 IEEE International Conference on vol. 1, Apr. 6-10, 2003, pp. I-368-I-371.

Xiaolong, M et al., "Sub-lexical modeling using a finite state transducer framework", Acoustics, Speech and Signal Processing, 2001, Proceedings, (ICASSP '01) 2001 IEEE International Conference on vol. 1, May, 7-11, 2001, pp. 573-576, Digital Object Identifier 10.1109/ICASSP.2001.940896.

Yi-Cheng, P. et al., "Large vocabulary continuous Mandarin speech recognition using finite state machine.", Chinese Spoken Language processing, 2004 International Symposium on Dec. 15-18, 2004, pp. 5-8, Digital Object Identifier 10.1109/CHINSL.2004.1409572.

Caseiro, D et al., A tail-sharing WFST composition algorithm for large vocabulary speech recognition, Acoustics, Speech and Signal Processing, 2003, Proceedings, (ICASSP '03) 2003 IEEE International Conference on vol. 1, Apr. 6-10, 2003, pp. I-356-I-359.

Caseiro, D. et al., "Transducer composition for 'on-the-fly' lexicon and language model integration", Automatic Speech Recognition and Understanding, 2001, ASRU '01, IEEE Workshop on Dec. 9-13, 2001, pp. 393-396.

Caskey, S.P. et al., "Interactive grammar inference with finite state transducers", Automatic Speech Recognition and Understanding, 2003, ASRU '03, 2003 IEEE Workshop on Nov.30-Dec. 3, 2003, pp. 572-576. Digital Object Identifier 10/1109/ASRU.2003.1318503.

Mohri, M. et al., "Full expansion of context-dependent networks in large vocabulary speech recognition", Acoustics, Speech and Signal Processing, 1998, Proceedings of the 1998 IEEE International Conference on vol. 2, May 12-15, 1998, pp. 665-668, vol. 2, Digital Object Identifier 10.1109/ICASSP.1998.675352.

Sproat, R. et al., "Multilingual text analysis for text-to-speech synthesis", 1996, ICSLP 96, Proceedings, Fourth International Conference on vol. 3, Oct. 3-6, 1996, pp. 1365-1368. Digital Object Identifier 10/1109/ICSLP. 1996.607867.

Olsen, J. et al., "A decoder for large vocabulary continuous short message dictation on embedded devices", Acoustics, Speech and Signal Processing, 2008, ICASSP 2008, IEEE International Conference on Mar. 31, 2008-Apr. 4, 2008, pp. 4337-4340. Digital Object Identifier 10.1109/ICASSP.2008.4518615.

Bowen, Z. et al., "Constraint Phrase-based Translation Using Weighted Finite State Transducer", Acoustics, Speech and Signal Processing, 2005, Proceedings, (ICASSP '05), IEEE International Conference on vol. 1, Mar. 18-23, 2005, pp. 1017-1020, Digital Object Identifier 10/1109/ICASSP.2005.1415289.

Mumolo, E. et al., "Pro-active service robots in health care framework: vocal interaction using natural language and prosody", Robot and Human Interactive Communication, 2001, Proceedings, 10th IEEE International Workshop on Sep. 18-21, 2001, pp. 606-611, Digital Object Identifier 10.1109/ROMAN.2001/981971.

Bangalore, S., "Compiling Boostexter Rules into a Finite-State Transducer", 42nd Annual Meeting of the Association for Computational Linguistics, Jul. 21, 2004, Barcelona, ES, XP002495569.

* cited by examiner

SYSTEM AND METHOD FOR COMPILING RULES CREATED BY MACHINE LEARNING PROGRAM

This application is a continuation of U.S. patent application Ser. No. 11/268,203, filed on Nov. 7, 2005, which claims the benefit of U.S. Provisional Patent Application 60/625,993, filed in the U.S. Patent and Trademark Office on Nov. 8, 2004, and are hereby incorporated by reference herein in their entirety.

BACKGROUND OF THE INVENTION

1. Field of the Invention

The present invention relates to a system and method for compiling rules created by machine learning programs and, more particularly, to a method for compiling rules into weighted finite-state transducers.

2. Introduction

Many problems in Natural Language Processing (NLP) can be modeled as classification tasks, either at the word or at the sentence level. For example, part-of-speech tagging, named-entity identification supertagging (associating each word with a label that represents syntactic information of the word given its context in a sentence), and word sense disambiguation are tasks that have been modeled as classification problems at the word level. In addition, there are problems that classify an entire sentence or document into one of a set of categories. These problems are loosely characterized as semantic classification and have been used in many practical applications including call routing and text classification.

Most of these problems have been addressed in isolation assuming unambiguous (one-best) input. Typically, however, in NLP applications, modules are chained together with each of the modules introducing some amount of error. In order to alleviate the errors introduced by a module, it is typical for the module to provide multiple weighted solutions (ideally as a packed representation) that serve as input to the next module. For example, a speech recognizer provides a lattice of possible recognition outputs that is to be annotated with part-of-speech and named-entities.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for compiling a group of linear rules created by machine learning is provided. A group of linear rules and associated weights are provided as a result of machine learning. Each one of the group of linear rules is partitioned into a respective one of a group of types of rules. A respective transducer for each of the linear rules is compiled. A combined finite state transducer is created from a union of the respective transducers compiled from the linear rules.

In a second aspect of the invention, a machine-readable medium having instructions recorded therein for at least one processor is provided. The machine-readable medium includes instructions for providing a group of linear rules and associated weights as a result of machine learning, instructions for partitioning each one of the group of linear rules into a respective one of a plurality of types of rules, instructions for compiling a respective transducer for each one of the group of linear rules, and instructions for creating a combined finite state transducer from a union of the respective transducers compiled from the group of linear rules.

In a third aspect of the invention, a system for compiling a group of linear rules created by machine learning is provided. The system includes at least one processor, a memory, and a bus to permit communications between the at least one processor and the memory. The system is configured to provide a group of linear rules and associated weights as a result of the machine learning, partition each one of the group of linear rules into a respective one of a group of types of rules, compile a respective transducer for each one of the group of linear rules, and create a combined finite state transducer from a union of the respective transducers compiled from the group of linear rules.

BRIEF DESCRIPTION OF THE DRAWINGS

In order to describe the manner in which the above-recited aspects and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Introduction

U.S. Pat. No. 5,819,247, which is hereby incorporated by reference herein in its entirety, discloses an apparatus and method for machine learning of a group of hypotheses used in a classifier component in, for example, NLP systems, as well as other systems. Machine learning techniques may be used to generate weak hypotheses for a training set of examples, such as, for example, a database including training speech. The resulting hypotheses may then be evaluated against the training examples. The evaluation results may be used to give a weight to each weak hypotheses such that a probability is increased that examples used to generate the next weak hypothesis are ones which were incorrectly classified by the previous weak hypothesis. A combination of the weak hypotheses according to their weights results in a strong hypothesis.

U.S. Pat. No. 6,453,307, which is hereby incorporated by reference herein in its entirety, discloses several boosting algorithms, which may be used in implementations consistent with the principles of the invention.

Finite state models have been extensively applied to many aspects of language processing including, speech recognition, phonology, morphology, chunking, parsing and machine translation. Finite-state models are attractive mechanisms for language processing since they (a) provide an efficient data structure for representing weighted ambiguous hypotheses, (b) are generally effective for decoding, and (c) are associated with a calculus for composing models which allows for straightforward integration of constraints from various levels of speech and language processing.

U.S. Pat. No. 6,032,111, which is hereby incorporated by reference herein in its entirety, discloses a system and method for compiling rules, such as weighted context dependent rewrite rules into weighted finite-state transducers. A compiling method is disclosed in which a weighted context dependent rewrite rule may be compiled by using a composition of five simple finite-state transducers.

Implementations consistent with the principles of the present invention utilize results of machine learning techniques, such as, for example, those disclosed in U.S. Pat. No. 5,819,247 to create a weighted finite-state transducer.

Exemplary System

Figure 1:
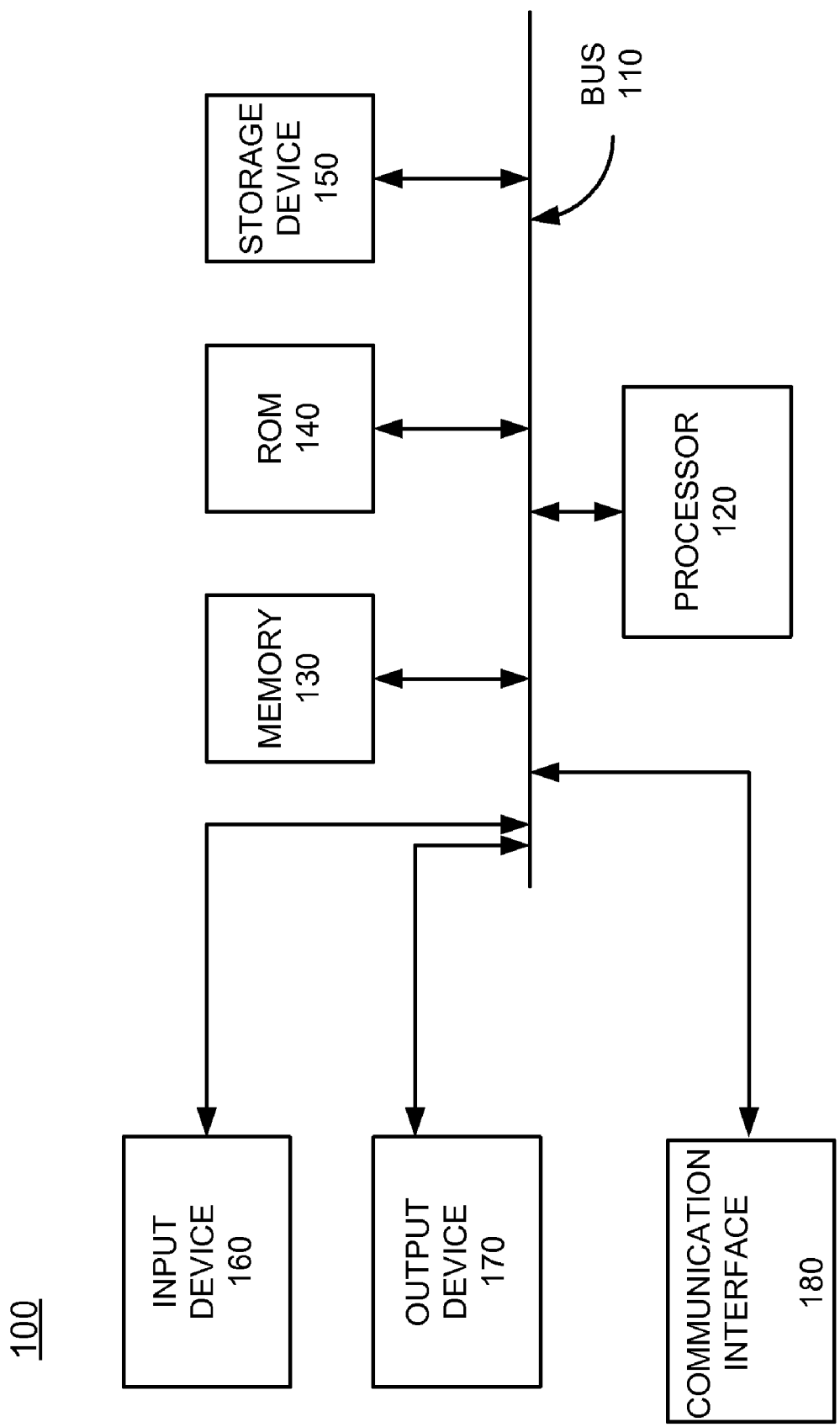
FIG. 1 illustrates an exemplary system in which implementations consistent with the principles of the invention may operate.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations consistent with the principles of the invention, storage device 150 may store and retrieve data according to a database management system.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device capable of creating and sending messages. In alternative implementations, such as, for example, a distributed processing implementation, a group of processing devices 100 may communicate with one another via a network such that various processors may perform operations pertaining to different aspects of the particular implementation.

Classification

In general, tagging problems may be characterized as search problems formulated as shown in Equation (1). $\Sigma$ is used to represent an input vocabulary, $\gamma$ is used to represent a vocabulary of n tags, an N word input sequence is represented as W ($\epsilon\Sigma^+$) and a tag sequence is represented as T ($\epsilon\gamma^+$). T*, the most likely tag sequence out of the possible tag sequences (T) that can be associated to W is of particular interest.

$$T^* = \arg\max_T P(T \mid W) \tag{1}$$

Following techniques of Hidden Markov Models (HMM) applied to speech recognition, these tagging problems have been previously modeled indirectly through the transformation of Bayes rule as in Equation 2. The problem may then be approximated for sequence classification by a $k^{th}$-order Markov model as shown in Equation (3).

$$T^* = \arg\max P(T \mid W)P(T) \tag{2}$$

$$\hat{T} = \arg\max_T \prod_{i=1}^{N} P(w_i \mid t_i)P(t_i \mid t_{i-1}\ldots t_{i-k-1}) \tag{3}$$

Although the HMM approach to tagging may easily be represented as a weighted finite-state transducer (WFST), it has a drawback in that use of large contexts and richer features results in sparseness leading to unreliable estimation of parameters of the model.

An alternate approach to arriving at T* is to model Equation 1 directly. There are many examples in recent literature. The general framework for these approaches is to learn a model from pairs of associations of the form $(x_i, y_i)$ where $x_i$ is a feature representation of W and $y_i$ ($\epsilon\gamma$) is one of the members of a tag set. Although these approaches have been more effective than HMMs, there have not been many attempts to represent these models as a WFST.

Boosting

U.S. Pat. No. 5,819,247 discloses is a machine learning tool which is based on the boosting family of algorithms. The basic idea of boosting is to build a highly accurate classifier by combining many "weak" or "simple" base learners, each one of which may only be moderately accurate. A weak learner or a rule b is a triple (p, $\vec{\alpha}$, $\vec{\beta}$), which may test a predicate (p) of the input (x) and may assign a weight $\alpha_i$ (i= 1, ... n) for each member (y) of $\gamma$ if p is true in x and may assign a weight ($\beta_i$) otherwise. It is assumed that a pool of such weak learners H={h} may be easily constructed.

From the pool of weak learners, the selection of a weak learner to be combined may be performed iteratively. At each iteration t, a weak learner $h_t$ may be selected that minimizes a prediction error loss function on a training corpus which takes into account the weight $w_t$ assigned to each training example. Intuitively, the weights may encode how important it is that $h_t$ correctly classify each of the training examples. Generally, the examples that were most often misclassified by the preceding base classifiers may be given the most weight so as to force the base learner to focus on the "hardest" examples. One machine learning tool, known as Boostexter, produces confidence rated classifiers $h_t$ that may output a real number $h_t(x, y)$ whose sign (− or +) may be interpreted as a prediction, and whose magnitude $|h_t(x)|$ may be a measure of "confidence". The iterative algorithm for combining weak learners may stop after a prespecified number of iterations or when training set accuracy saturates.

In the case of text classification applications, the set of possible weak learners may be instantiated from simple n-grams of input text (W). Thus, if $x_n$ is a function to produce all n-grams up to n of its argument, then the set of predicates for the weak learners is $P=x_n(W)$. For word-level classification problems, which take into account a left and right context, the set of weak learners created from the word features may be extended with those created from the left and right context features. Thus, features of the left context ($\phi_L^i$), features of the right context ($\phi_R^i$) and the features of the word itself ($\phi_{w_i}^i$) constitute the features at position i. The predicates for the pool of weak learners may be created from this set of features and are typically n-grams on the feature representations. Thus, the set of predicates resulting from the word level features may be $H_W = \cup_i x_n(\phi_{w_i}^i)$, from left context features may be $H_L = \cup_i x_n(\phi_L^i)$ and from right context features may be $H_R = \cup_i x_n(\phi_R^i)$. The set of predicates for the weak learners for word level classification problems may be: $H = H_W \cup H_L \cup H_R$.

Training may employ a machine learning technique such as, for example, a boosting algorithm, which may provide a set of selected rules $\{h_1, h_2, \ldots, h_N\}$ ($\subseteq H$). The output of the final classifier may be $$F(x, y) = \sum_{t=1}^{N} h_t(x, y),$$

i.e. the sum of confidence of all classifiers $h_t$. The real-valued predictions of the final classifier F may be converted into probabilities by a logistic function transform; that is $$P(y \mid x) = \frac{e^{F(x,y)}}{\sum_{y' \in \gamma} e^{F(x,y')}} \quad (4)$$

Thus the most likely tag sequence T* may be determined as in Equation 5, where $P(t_i | \phi_L^i, \phi_R^i, \phi_{w_i}^i)$ may be computed using Equation 4.

$$T^* = \arg\max_T \prod_{i=1}^{N} P(t_i \mid \phi_L^i, \phi_R^i, \phi_{w_i}^i) \quad (5)$$

Previously, using boosted rule sets was restricted to cases where the test input was unambiguous such as strings or words (not word graphs). By compiling these rule sets into WFSTs, their applicability may be extended to packed representations of ambiguous input such as word graphs.

Compilation

Weak learners selected at the end of the training process may be partitioned into one of three types based on the features that the learners tested.

$h_W$: tests features of a word (or, alternatively, a sentence)
$h_L$: tests features of the left context
$h_R$: tests features of the right context (Weighted) context-dependent rewrite rules have the general form $$\phi \to \tilde{\phi} | \gamma\_\delta \quad (6)$$

where $\phi$, $\tilde{\phi}$, $\gamma$ and $\delta$ are regular expressions on the alphabet of the rules. The interpretation of these rules are as follows: Rewrite $\phi$ by $\tilde{\phi}$ when it is preceded by $\gamma$ and followed by $\delta$. Furthermore, $\tilde{\phi}$ may be extended to a rational power series which are weighted regular expressions in which the weights may encode preferences over the paths in $\tilde{\phi}$.

Each weak learner may be viewed as a set of weighted rewrite rules mapping the input word (or sentence) into each member $y_i$ ($\in \gamma$) with a weight $\alpha_i$ when the predicate of the weak learner is true and with weight $\beta_i$ when the predicate of the weak learner is false. Exemplary translation between the three types of weak learners and the weighted context-dependency rules is shown in Table 1.

TABLE 1

Translation of three types of weak learners into weighted context dependency rules

| Type of Weak | Weak Learner | Weighted Context Dependency Rule |
| --- | --- | --- |
| $h_W$ | If WORD==w then $y_i:\alpha_i$ else $y_i:\beta_i$ | $w \to \alpha_1 y_1 + \alpha_2 y_2 \ldots \alpha_n y_n \mid \_\_\_$ <br> $(\Sigma - w) \to \beta_1 y_1 + \beta_2 y_2 \ldots + \beta_n y_n \mid \_\_\_$ |
| $h_L$ | If LeftContext==w then $y_i:\alpha_i$ else $y_i:\beta_i$ | $\Sigma \to \alpha_1 y_1 + \alpha_2 y_2 \ldots + \alpha_n y_n \mid w \_\_$ <br> $\Sigma \to \beta_1 y_1 + \beta_2 y_2 \ldots + \beta_n y_n \mid (\Sigma - w) \_\_$ |
| $h_R$ | If RightContext==w then $y_i:\alpha_i$ else $y_i:\beta_i$ | $\Sigma \to \alpha_1 y_1 + \alpha_2 y_2 \ldots + \alpha_n y_n \mid \_\_ w$ |

These rules may apply left to right on an input and may not repeatedly apply at the same point in an input because the output vocabulary $\gamma$ would typically be disjoint from the input vocabulary $\Sigma$.

A technique described in U.S. Pat. No. 6,032,111 may be used to compile each of the weighted context-dependency rules into a WFST. The compilation may be accomplished by introduction of context symbols which are used as markers to identify locations for rewrites of $\phi$ with $\tilde{\phi}$. After the rewrites, the markers may be deleted. The compilation process may be represented as a composition of five transducers.

The WFSTs resulting from the compilation of each selected weak learner ($\lambda_i$) may be unioned to create the WFST to be used for decoding. The weights of paths with both the same input and output labels may be added during the union operation.

$$\Lambda = \cup_i \lambda_i \quad (7)$$

Due to the difference in the nature of the learning algorithm, compiling decision trees results in a composition of WFSTs representing rules on the path from the root to a leaf node, while compiling boosted rules results in a union of WFSTs, which is expected to result in smaller transducers. We define rules that may be compiled into a union of WFSTs as linear rules.

In order to apply a WFST for decoding, a model with input represented as an WFST ($\lambda_x$) may be composed and searched for the best path (if one is interested in a single best classification result).

$$y^* = \text{BestPath}(\lambda_x \circ \Lambda) \quad (8)$$

Figure 2:
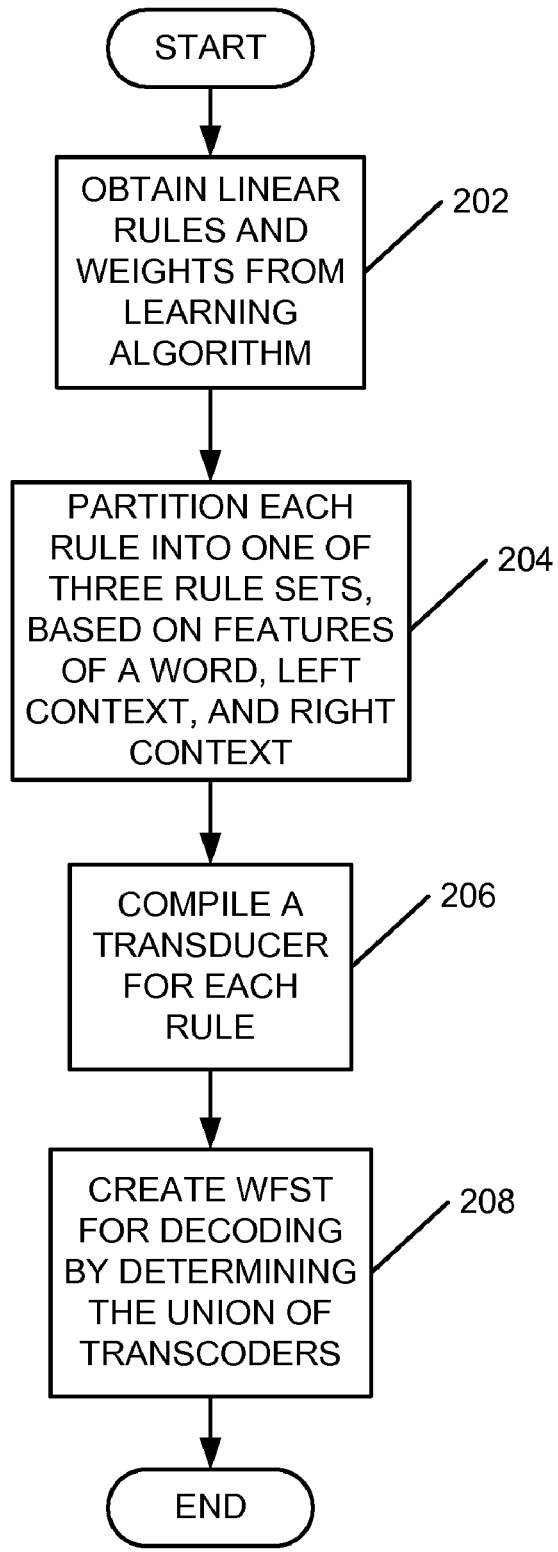
FIG. 2 is a flowchart that illustrates an exemplary method that may be used in implementations consistent with principles of the invention.

FIG. 2 is a flowchart illustrating an exemplary process that may be used in implementations consistent with the principles of the invention. The process may begin by obtaining linear rules and weights from a machine learning tool (act 202) such as, for example, Boostexter, or a machine learning tool that may employ a boosting algorithm. In one implementation consistent with the principles of the invention, the machine learning tool may include a boosting algorithm such as, for example, an AdaBoost classifier. Each one of the rules may then be partitioned into one of a group of context-dependent rewrite rule types (act 204). For example, the rule types may include a first rule type for testing a feature of a word or a sentence, a second rule type for testing a feature of a left context, and a third rule type for testing a feature of a right context. Each of the rules may then be compiled to create a WFST (act 206). U.S. Pat. No. 6,032,111 discloses a method for creating transducers from context-dependent rewrite rules that may be employed in implementations consistent with the principles of the invention. The created WFSTs may then be unioned to provide a combined WFST for decoding (act 208). The combined WFST may be used, for example, to process speech transcribed by an automatic speech recognition device and to provide a label or classification for the transcribed speech.

EXPERIMENTAL RESULTS

A machine learning tool, Boostexter, was trained on transcriptions of speech utterances from a call routing task with a vocabulary ($|\Sigma|$) of 2,912 and 40 classes (n=40). There were a total of 1,800 rules comprising 900 positive rules and their negative counterparts. The rules resulting from Boostexter were then compiled into WFSTs and then the union of the WFSTs were combined into a single combined WFST. The combined WFST resulting from compiling the rules had 14,372 states and 5.7 million arcs. Accuracy of the combined WFST on a random set of 7,013 sentences was the same (85% accuracy) as accuracy with a decoder that accompanies the Boostexter machine learning tool. This validated the compilation procedure.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

I claim:

1. A method for compiling a plurality of linear rules created by machine learning for use in natural language processing, the method comprising:
    compiling a respective transducer for each one of a plurality of types of rules obtained by partitioning a plurality of linear rules;
    creating a combined finite state transducer from a union of the respective transducers compiled from the plurality of linear rules; and processing natural language speech using the combined finite state transducer.

2. The method of claim 1, wherein the plurality of linear rules have associated weights and are provided as a result of machine learning.

3. The method of claim 2, wherein partitioning of the plurality of linear rules further comprises partitioning each of the plurality of the linear rules into a respective one of the plurality of types of rules.

4. The method of claim 3, wherein the machine learning comprises assigning weights to the plurality of linear rules based on using a boosting algorithm.

5. The method of claim 3, wherein the partitioned plurality of linear rules comprises weighted rewrite rules.

6. The method of claim 1, wherein the plurality of types of rules comprise:
a first rule type for testing a feature of a word or a sentence,
a second rule type for testing a feature of a left context, and
a third rule type for testing a feature of a right context.

7. The method of claim 1, further comprising:
applying an input to the combined finite state transducer;
searching for a best path for the input with respect to the finite state transducer; and
determining a best classification result based on the best path.

8. The method of claim 1, wherein creating a combined finite state transducer from a union of the respective transducers for the plurality of linear rules further comprises:
adding weights of paths having both a same input label and a same output label.

9. The method of claim 1, wherein compiling a respective transducer for each of the plurality of linear rules comprises:
compiling each of the respective transducers from a set of five transducers.

10. A machine-readable medium having instructions recorded therein for at least one processor to process natural language, the machine-readable medium comprising:
instructions for providing a plurality of linear rules and associated weights as a result of machine learning;
instructions for partitioning each of the plurality of linear rules into a respective one of a plurality of types of rules;
instructions for compiling a respective transducer for each of the types of rules with the associated partitioning from the plurality of linear rules;
instructions for creating a combined finite state transducer from a union of the respective transducers compiled from the plurality of linear rules; and
instructions for processing natural language speech using the combined finite state transducer.

11. The machine-readable medium of claim 10, wherein the plurality of linear rules have associated weights and are provided as a result of machine learning.

12. The machine-readable medium of claim 11, wherein partitioning of the plurality of linear rules further comprises partitioning each of the plurality of the linear rules into a respective one of the plurality of types of rules.

13. The machine-readable medium of claim 12, wherein the machine learning comprises assigning weights to the plurality of linear rules based on using a boosting algorithm.

14. The machine-readable medium of claim 12, wherein the partitioned plurality of linear rules comprise weighted rewrite rules.

15. The machine-readable medium of claim 10, wherein the plurality of types of rules comprise:
a first rule type for testing a feature of a word or a sentence,
a second rule type for testing a feature of a left context, and
a third rule type for testing a feature of a right context.

16. The machine-readable medium of claim 10, further comprising:
applying an input to the combined finite state transducer;
searching for a best path for the input with respect to the finite state transducer; and
determining a best classification result based on the best path.

17. The machine-readable medium of claim 10, wherein creating a combined finite state transducer from a union of the respective transducers for the plurality of linear rules further comprises:
adding weights of paths having both a same input label and a same output label.

18. The method of claim 10, wherein compiling a respective transducer for each of the plurality of linear rules comprises:
compiling each of the respective transducers from a set of five transducers.

19. A system is configured to compile respective transducer for each one of a plurality of linear rules created by machine learning, the plurality of linear rules for use in natural language processing, the system comprising:
at least one processor;
a memory;
a bus to permit communications between the at least one processor and the memory, wherein:
the system is configured to:
compile a respective transducer for each of the types of rules with the associated partitioning from the plurality of linear rules;
create a combined finite state transducer from a union of the respective transducers compiled from the plurality of linear rules; and
process natural language speech using the combined finite state transducer.

20. A system for compiling a plurality of linear rules created by machine learning for use in natural language processing, the system comprising:
means for compiling a respective transducer for each of the types of rules with the associated partitioning from the plurality of linear rules;
means for creating a combined finite state transducer from a union of the respective transducers compiled from the plurality of linear rules; and
means for processing natural language speech using the combined finite state transducer.

* * * * *